United States Patent
Covaro et al.

(10) Patent No.: US 8,890,679 B2
(45) Date of Patent: *Nov. 18, 2014

(54) SMART POWER DEVICE (71) Applicant: Redwood Systems, Inc., Fremont, CA (US)

(72) Inventors: Mark Covaro, Sonoma, CA (US); Dave Leonard, Danville, CA (US)

(73) Assignee: Redwood Systems, Inc., Fremont, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/769,550

(22) Filed: Feb. 18, 2013

(65) Prior Publication Data

US 2013/0154512 A1 Jun. 20, 2013

Related U.S. Application Data (63) Continuation of application No. 13/568,895, filed on Aug. 7, 2012, now Pat. No. 8,390,441, which is a (Continued)

(51) Int. Cl.
G08B 1/08 (2006.01)
H05B 37/02 (2006.01)
H04B 3/54 (2006.01)
G05F 1/577 (2006.01)
H02J 13/00 (2006.01)

(52) U.S. Cl.
CPC ........ *H05B 37/02* (2013.01); *H04B 2203/5441* (2013.01); *H04B 3/548* (2013.01);

(Continued)

(58) Field of Classification Search
CPC .................................................. H02J 13/0003

USPC .............. 340/538, 538.11, 538.15, 540, 541, 340/568.2, 870, 12.32, 12.33, 12.37; 320/101

See application file for complete search history.

(56) References Cited

U.S. PATENT DOCUMENTS 3,660,738 A  5/1972  Anderson et al. ............. 318/138
4,578,533 A  3/1986  Pierce ............................... 179/2

(Continued)

FOREIGN PATENT DOCUMENTS

EP  1 087 506 A2  3/2001  ............. H02M 3/156
JP  60-140950  7/1985  ............... H04B 3/54

(Continued)

OTHER PUBLICATIONS

U.S. Appl. No. 13/423,828, filed Mar. 19, 2012, Covaro et al.

(Continued)

*Primary Examiner* — Tai T Nguyen
(74) *Attorney, Agent, or Firm* — Myers Bigel Sibley & Sajovec, P.A.

(57) ABSTRACT

A power device may include channels coupled to conductors in lines, where each one of the channels is coupled to a different one of the lines than the other channels and where the channels deliver direct current power signals over the conductors to the load devices. Each one of the load devices may be powered by a different one of the direct current power signals. The power device may include a power communicator that communicates with the load devices over the conductors that propagate the direct current power signals. The power communicator may determine a target power level for the load devices based on the communication over the conductors. The load device may adjust an amount of power in the direct current power signals in order to match the target power level.

20 Claims, 3 Drawing Sheets

Related U.S. Application Data continuation of application No. 12/790,038, filed on May 28, 2010, now Pat. No. 8,248,230, which is a continuation-in-part of application No. 12/389,868, filed on Feb. 20, 2009, now Pat. No. 8,427,300, and a continuation-in-part of application No. 12/536,231, filed on Aug. 5, 2009, now Pat. No. 8,207,635, and a continuation-in-part of application No. 12/753,376, filed on Apr. 2, 2010.

(60) Provisional application No. 61/330,536, filed on May 3, 2010.

(52) U.S. Cl.
CPC ... *H04B 2203/547* (2013.01); *H04B 2203/5445* (2013.01); *Y02B 20/48* (2013.01); *H04B 2203/545* (2013.01); *H05B 37/0263* (2013.01); *G05F 1/577* (2013.01); *H02J 13/0003* (2013.01)
USPC ............... 340/538; 340/538.11; 340/538.15; 340/540; 340/541; 340/568.2; 340/870.2; 340/12.32; 340/12.33; 340/12.37; 320/101

(56) References Cited

U.S. PATENT DOCUMENTS

| | | | | |
|---|---|---|---|---|
| 4,725,762 | A | 2/1988 | Jagschitz | 315/226 |
| 4,737,787 | A | 4/1988 | Ito et al. | 340/870.18 |
| 4,740,952 | A | 4/1988 | Vernieres et al. | 370/24 |
| 4,949,359 | A | 8/1990 | Voillat | 375/106 |
| 5,293,628 | A | 3/1994 | Langan et al. | 395/550 |
| 5,396,555 | A | 3/1995 | Shibata et al. | 379/412 |
| 5,473,635 | A | 12/1995 | Chevroulet | 375/287 |
| 5,627,833 | A | 5/1997 | Bliven | 370/464 |
| 5,668,446 | A | 9/1997 | Baker | |
| 5,684,826 | A | 11/1997 | Ratner | 375/222 |
| 5,793,754 | A | 8/1998 | Houldsworth et al. | 370/276 |
| 5,798,913 | A | 8/1998 | Tiesinga et al. | 363/21 |
| 5,903,607 | A | 5/1999 | Tailliet | 375/257 |
| 5,905,406 | A | 5/1999 | Sugden et al. | 329/312 |
| 6,097,761 | A | 8/2000 | Bühring et al. | 375/257 |
| 6,111,918 | A | 8/2000 | Gotaas | 375/257 |
| 6,144,292 | A | 11/2000 | Brown | 340/310.01 |
| 6,229,432 | B1 | 5/2001 | Fridley et al. | 340/310.01 |
| 6,295,356 | B1 | 9/2001 | De Nicolo | 379/413 |
| 6,348,780 | B1 | 2/2002 | Grant | 323/222 |
| 6,496,104 | B2 | 12/2002 | Kline | 340/310.01 |
| 6,535,983 | B1 | 3/2003 | McCormack et al. | 713/310 |
| 6,549,120 | B1 | 4/2003 | De Buda | 340/310.01 |
| 6,654,409 | B1 | 11/2003 | Scott et al. | 375/222 |
| 6,674,270 | B2 * | 1/2004 | Sakamoto | 323/272 |
| 6,772,011 | B2 * | 8/2004 | Dolgin | 607/61 |
| 6,812,584 | B2 * | 11/2004 | Renner | 290/40 A |
| 6,853,173 | B2 | 2/2005 | Caine et al. | 323/285 |
| 6,870,282 | B1 | 3/2005 | Bischoff et al. | 307/130 |
| 6,980,122 | B2 | 12/2005 | Novikov | 340/825.72 |
| 7,005,969 | B2 | 2/2006 | Fisher et al. | 340/310.01 |
| 7,012,505 | B1 | 3/2006 | Arden | 340/310.01 |
| 7,042,351 | B2 | 5/2006 | Kline | 340/538 |
| 7,102,490 | B2 | 9/2006 | Flen et al. | 340/310.18 |
| 7,113,547 | B2 | 9/2006 | Inoue et al. | 375/256 |
| 7,126,463 | B2 | 10/2006 | Bauerle et al. | 340/453 |
| 7,205,749 | B2 | 4/2007 | Hagen et al. | 323/222 |
| 7,279,282 | B2 | 10/2007 | Tahara et al. | 318/46 |
| 7,327,222 | B2 | 2/2008 | Peltonen | 340/310.11 |
| 7,369,629 | B2 | 5/2008 | Umewaka | 375/334 |
| 7,420,142 | B2 * | 9/2008 | Barrena et al. | 219/501 |
| 7,583,734 | B2 | 9/2009 | Nakashima et al. | 375/257 |
| 8,058,750 | B2 | 11/2011 | Covaro et al. | 307/125 |
| 8,207,635 | B2 | 6/2012 | Covaro | 307/112 |
| 8,248,230 | B2 | 8/2012 | Covaro et al. | 340/538 |
| 8,390,441 | B2 | 3/2013 | Covaro et al. | |
| 8,427,300 | B2 | 4/2013 | Covaro et al. | |
| 2003/0043038 | A1 | 3/2003 | Izadinia et al. | 340/568.2 |
| 2003/0090244 | A1 | 5/2003 | Shenai et al. | 323/259 |
| 2003/0189495 | A1 | 10/2003 | Pettler et al. | 340/854.3 |
| 2004/0124338 | A1 | 7/2004 | Cloutier et al. | 250/214 C |
| 2005/0200317 | A1 | 9/2005 | Novikov | 315/312 |
| 2005/0213352 | A1 | 9/2005 | Lys | 363/17 |
| 2005/0231133 | A1 | 10/2005 | Lys | 315/291 |
| 2006/0038661 | A1 | 2/2006 | Reinhold et al. | 340/310.11 |
| 2006/0049693 | A1 | 3/2006 | Abraham et al. | 307/10.1 |
| 2006/0152171 | A1 | 7/2006 | Kinjou | 315/274 |
| 2006/0222089 | A1 | 10/2006 | Dicky | 375/259 |
| 2006/0284728 | A1 | 12/2006 | Rubinstein et al. | 340/310.12 |
| 2006/0290210 | A1 | 12/2006 | Foard | 307/147 |
| 2007/0014304 | A1 | 1/2007 | Wu et al. | 370/431 |
| 2007/0143508 | A1 | 6/2007 | Linnman | 710/100 |
| 2007/0188114 | A1 | 8/2007 | Lys et al. | 315/308 |
| 2007/0286305 | A1 | 12/2007 | Saggini et al. | 375/272 |
| 2008/0012502 | A1 | 1/2008 | Lys | 315/247 |
| 2008/0130322 | A1 | 6/2008 | Artusi et al. | 363/21.01 |
| 2008/0147335 | A1 | 6/2008 | Adest et al. | 702/64 |
| 2008/0218148 | A1 | 9/2008 | Robertson et al. | 323/349 |
| 2008/0224536 | A1 | 9/2008 | Yamazaki | 307/1 |
| 2009/0086487 | A1 | 4/2009 | Ruud et al. | 362/249.02 |
| 2009/0129032 | A1 | 5/2009 | Liedtke et al. | |
| 2009/0195063 | A1 | 8/2009 | Joseph et al. | |
| 2009/0236910 | A1 | 9/2009 | Yamada et al. | 307/40 |
| 2009/0267540 | A1 | 10/2009 | Chemel et al. | |
| 2010/0138363 | A1 | 6/2010 | Batterberry et al. | 705/412 |
| 2010/0141153 | A1 | 6/2010 | Recker et al. | 315/149 |
| 2010/0214082 | A1 | 8/2010 | Covaro et al. | 340/310.12 |
| 2010/0253244 | A1 | 10/2010 | Snook et al. | 315/307 |
| 2011/0241567 | A1 | 10/2011 | Covaro et al. | 315/297 |
| 2011/0266345 | A1 | 11/2011 | Fowler et al. | 235/439 |
| 2012/0303173 | A1 | 11/2012 | Covaro et al. | 700/295 |
| 2013/0154512 | A1 | 6/2013 | Covaro et al. | |

FOREIGN PATENT DOCUMENTS

| | | | |
|---|---|---|---|
| JP | H06-335251 A | 12/1994 | |
| NL | 1 035 368 C2 | 10/2009 | |
| WO | WO 99/67880 | 12/1999 | H03H 3/00 |
| WO | WO 2008/119996 A1 | 10/2008 | |
| WO | WO 2008/134433 A1 | 11/2008 | |

OTHER PUBLICATIONS

IRPLLED1 350mA to 1.5A High Voltage LED Driver using IRS2540, downloaded Feb. 17, 2009, pp. 1-29, IRF, available at www.irf.com.

Pulse-width Modulation, dated Feb. 2009, pp. 1-6, Wikipedia, available at http://en.wikipedia.org/wiki/Pulse_width_modulation.

Duty Cycle, Wikipedia, dated Jan. 8, 2009, pp. 1-2, available at http://en.wikipedia.org/wiki/Duty_cycle.

Stefanutti, W., Mattavelli, P., Saggini, S., Panseri, L., Communication on Power Lines Using Frequency and Duty-Cycle Modulation in Digitally Controlled dc-dc Converters, dated no later than Dec. 31, 2006, pp. 2144-2149, IEEE.

Saggini, S., Stefanutti, W., Mattavelli, P., Garcea, G., Gihoni, M., Power Line Communication in dc-dc Converters Using Switching Frequency Modulation, dated no later than Dec. 31, 2006, pp. 1595-1600, IEEE.

Stephens, W.E., Banwell, T.C., Lalk, G.R., Robe, T.J., Young, K.C., Transmission of STS-3c (155 Mbit/sec) SONET/ATM Signals Over Unshielded and Shielded Twisted Pair Copper Wire, dated no later than Dec. 31, 1992, pp. 170-174, IEEE.

Aghajeri, S., Shafiee, H., Synchronization in OFDM Powerline Communication Systems in Presence of Narrowband Interferences, dated no later than Dec. 31, 2003, pp. 359-362, IEEE.

Santolaria, A., Balcells, J., González, D., Gago, J., Evaluation of Switching Frequency Modulation in EMI Emissions Reduction Applied to Power Converters, dated no later than Dec. 31, 2003, pp. 2306-2311, IEEE.

Schur, Romed, Speidel, Joachim, Angerbauer, Ralf, Reduction of Guard Interval by Impulse Compression for DMT Modulation on Twisted Pair Cables, dated no later than Dec. 31, 2000, pp. 1632-1636, IEEE.

(56) References Cited

OTHER PUBLICATIONS

Barton, Melbourne, Honig, Michael L., Optimization of Discrete Multitone to Maintain Spectrum Compatibility with Other Transmission Systems on Twisted Copper Pairs, dated no later than Dec. 31, 1995, pp. 1558-1563, IEEE.

Linear Regulator, Wikipedia, dated Feb. 5, 2009, pp. 1-5, available at www.wikipedia.org.

X10 (industry standard), Wikipedia, dated Oct. 4, 2007, pp. 1-7, available at www.wikipedia.org.

Bi-Level Lighting Control Credits, dated Jun. 27, 2002, pp. 1-15, Pacific Gas and Electric Company, available at www.energy.ca.gov.

Flourescent Ballasts—Dimming, downloaded Mar. 9, 2010, p. 1, Koninklijke Philips Lighting Electronics, The Netherlands, available at www.advance.philips.com.

Mark 7® 0-10 Volt, downloaded Mar. 9, 2010, pp. 1-2, Koninklijke Philips Lighting Electronics, The Netherlands, available at www.advance.philips.com.

Quicktronic Powersense® T8 Dimming Universal Voltage, downloaded Mar. 9, 2010, pp. 1-2, Osram Sylvania, available at www.sylvania.com.

Dimming & Dali Ballasts, downloaded Mar. 9, 2010, pp. 1-2, Osram Sylvania, available at www.sylvania.corn.

Office Action, dated Apr. 26, 2011, pp. 1-24, U.S. Appl. No. 12/465,800, U.S. Patent and Trademark Office, Virginia.

Notice of Allowance, dated Sep. 28, 2011, pp. 1-9, U.S. Appl. No. 12/465,800, U.S. Patent and Trademark Office, Virginia.

Office Action, dated Nov. 7, 2011, pp. 1-14, U.S. Appl. No. 12/536,231, U.S. Patent and Trademark Office, Virginia.

Notice of Allowance, dated Jan. 6, 2012, pp. 1-11, U.S. Appl. No. 12/536,231, U.S. Patent and Trademark Office, Virginia.

Notice of Allowance, dated Jul. 16, 2012, pp. 1-15, U.S. Appl. No. 12/790,038, U.S. Patent and Trademark Office, Virginia.

Office Action, dated May 19, 2011, pp. 1-14, U.S. Appl. No. 12/536,231, U.S. Patent and Trademark Office, Virginia.

Office Action, dated Oct. 15, 2012, pp. 1-20, U.S. Appl. No. 12/389,868, U.S. Patent and Trademark Office, Virginia.

Office Action, dated Jan. 4, 2013, pp. 1-22, U.S. Appl. No. 12/753,376, U.S. Patent and Trademark Office, Virginia.

Office Action, dated Sep. 26, 2012, pp. 1-11, U.S. Appl. No. 13/568,895, U.S. Patent and Trademark Office, Alexandria, Virginia.

Notice of Allowance, dated Dec. 26, 2012, U.S. Appl. No. 13/568,895, pp. 1-8, U.S. Patent and Trademark Office, Alexandria, Virginia.

European Extended Search Report Corresponding to European Patent Application No. 11003568; Dated: Oct. 24, 2013; 13 Pages.

\* cited by examiner

SMART POWER DEVICE

This application is a continuation of, and claims priority under 35 U.S.C. §120 to, U.S. patent application Ser. No. 13/568,895, entitled "SMART POWER DEVICE," filed Aug. 7, 2012, the entire contents of which are hereby incorporated herein by reference, which issued as U.S. Pat. No. 8,390,441 on Mar. 5, 2013, which is a continuation of, and claims priority under 35 U.S.C. §120 to, U.S. patent application Ser. No. 12/790,038, entitled "SMART POWER DEVICE," filed May 28, 2010, the entire contents of which are hereby incorporated herein by reference, which issued as U.S. Pat. No. 8,248,230 B2 on Aug. 21, 2012, and claims priority under 35 U.S.C. §119(e) to U.S. Provisional Application No. 61/330,536, "SMART POWER DEVICE" filed May 3, 2010, the entire contents of which are hereby incorporated herein by reference, and which is a continuation-in-part (CIP) of, and claims priority under 35 U.S.C. §120 to, U.S. patent application Ser. No. 12/389,868, entitled "TRANSMISSION OF POWER AND DATA WITH FREQUENCY MODULATION," filed Feb. 20, 2009, the entire contents of which are hereby incorporated herein by reference, U.S. patent application Ser. No. 12/536,231, entitled "DIGITAL SWITCH COMMUNICATION," filed Aug. 5, 2009, and issued as U.S. Pat. No. 8,207,635 B2 on Jun. 26, 2012, the entire contents of which are hereby incorporated herein by reference, and U.S. patent application Ser. No. 12/753,376, entitled "HYBRID FLUORESCENT LIGHT CONTROLLER," filed Apr. 2, 2010, the entire contents of which are hereby incorporated herein by reference.

BACKGROUND

1. Technical Field

This application relates to transmission of power and, in particular, to transmission of power and data together.

2. Related Art

Power in buildings is distributed as alternating current (AC) at fixed voltages, such as 120 Volts, 220 Volts, 240 Volts, 277 Volts, 480 Volts, or any other suitable voltage. Wiring transports the AC to multiple devices throughout a building. Devices may be grouped into circuits so that multiple devices on each of the circuits receive their power over a common wire. The common wire may include two or three conductors. For example, the common wire may include three 10 American wire gauge (AWG) conductors: an earth or ground conductor, a live conductor, and a neutral conductor. The wiring installed in buildings may need to be substantial enough to carry a relatively large amount of current because the type and number of devices that may ultimately be connected to any one circuit may be unknown at the time of installation.

AC consuming devices, such as incandescent lights and household fans with AC single-phase induction motors, may directly use the AC power received from the building wiring. Direct current (DC) consuming devices, such as televisions and computers, may include switched-mode power supplies (SMPS). The switched-mode power supply may convert the AC received over the building wiring to DC that has a voltage suitable for the particular DC consuming device.

SUMMARY

A system may be provided that includes a power device electrically coupled to multiple lines, where the power device generates a direct current power signal on each one of the lines. The system may include load devices electrically coupled to the lines. The load devices may be powered from the direct current power signal generated on each one of the lines. Each one of the load devices is coupled to a different one of the lines than the other load devices. The system may include load communicators electrically coupled to the lines such that each one of the load communicators is coupled to a different one of the lines than the other load communicators. The load communicators may transmit data to the power device via conductors that propagate the direct current power signal to the load devices. The power device may determine a power level for each one of the load devices based on the data received. The power device may adjust the power in the direct current power signal on each one of the lines to match the power level for each respective one of the load devices.

A power device may be provided that includes channels coupled to lines, where each one of the channels is coupled to a different one of the lines than the other channels and where the channels deliver direct current power signals over conductors in the lines to the load devices. Each one of the load devices may be powered by a different one of the direct current power signals than the other load devices. The power device may include a power communicator that communicates with the load devices over the conductors that propagate the direct current power signals. The power communicator may determine a target power level for the load devices based on the communication over the conductors. The load device may adjust an amount of power in the direct current power signals in order to match the target power level.

A method may be provided that powers load devices affixed to a building. The direct current power signal on each one of the lines may be generated by a power device. The direct current power signal powers the load devices. Each one of the load devices is coupled to a different one of the lines than the other load devices. Information is received at the power device from the load devices via conductors that propagate the direct current power signal to the load devices. The target power level for each one of the load devices is determined based on the information. The power device may adjust an amount of power in the direct current power signal on each one of the lines to match the target power level for each one of the load devices.

Further objects and advantages of the present invention will be apparent from the following description, reference being made to the accompanying drawings wherein preferred embodiments of the present invention are shown.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

A power device may provide a DC power signal over multiple lines to multiple load devices. The load devices may include light fixtures, sensors, motors, display screens, or any other device that consumes electrical power. The load devices may be powered by the DC power signal. Each one of the load devices may receive the DC power signal over a different one of the lines than the other load devices. The DC power signal of one or more of the lines may be used by multiple load devices. The DC power signal may be pulse-width modulated (PWM) signal.

Each one of the load devices may include a load communicator. Alternatively or in addition, the load communicators may be electrically coupled to the lines at or near the load devices. The load communicator may be any circuit that transmits data to or receives data from the power device via the same conductor or conductors that propagate the DC power signal over the line to the load device. For example, each one of the lines may include two conductors that propagate the DC power signal to a corresponding one of the load devices. Two or more of the lines may be included in a single cable. For example, a Category 5 cable may include four lines, where each one of the lines is twisted-pair wiring consisting of two conductors twisted together, for a total of eight conductors in the Category 5 cable. The load communicator may alter the impedance between the two conductors at the load end in order to transmit the data to the power device. Alternatively, the same category 5 cable may include seven lines, where seven of the eight conductors correspond to the lines and the eighth conductor is a ground. Alternatively or in addition, each one of the lines may include a single conductor.

The power device may determine a power level suitable for each of the load devices based on the data transmitted to the power device from the load communicators. For example, the power level may include a desired current level, a desired voltage level, a desired average power, or any combination thereof. The power device may adjust the power in the DC power signal on each one of the lines to match the power level that is suitable for each respective one of the load devices. For example, the power device may transmit more power to a motor than to light fixture. To adjust the power in the DC power signal, the power device may alter the amplitude of the voltage of the DC power signal, the amplitude of the current of the DC power signal, the duty cycle of the DC power signal, or any combination thereof.

The load device may include a load communicator that is specific to the type of load device. For example, the load communicator may be a light adapter that is designed to work with a light fixture. The load communicator may be in communication with additional devices such as sensors. For example, the light adapter may receive a measured light level from a photosensor. The light adapter may transmit the measured light level to the load device. The load device may then determine the power level for a light fixture based on the measured light level as compared to a target light level. By adjusting the power level of the DC power signal to the light fixture, the power device may adjust the total light in a room to match the target light level.

The power device may include a modular chassis that receives a variety of output channel cards and inlet cards. Each one of output channel cards may provide different maximum power levels than the others. Each one of the inlet cards may receive power from a different type of power source. For example, one inlet card may receive power from an AC (alternating current) source, such as a power grid, and a second inlet card may receive power from a DC source, such as a solar panel.

The power device may include a network interface controller that is in communication with a data network, such as a LAN (local area network). The power device may relay data between the load communicators and a computing device via the data network. Therefore, the computing device may communicate with the load devices.

One technical advantage of the systems and methods described herein may be that power may be more efficiently delivered to load devices than in other systems. Each one of the load devices does not need to convert AC to DC. Another technical advantage of the systems and methods described below may be wiring that is less expensive than building wiring may be used throughout a building in order to power the load devices. Another technical advantage may be that an overlay network dedicated to communication is not required to supplement a network that is dedicated to delivering power to the load devices. Yet another technical advantage may be enablement of innovative solutions based on the ability to communicate with the load devices.

1. Smart Power Device

Figure 1:
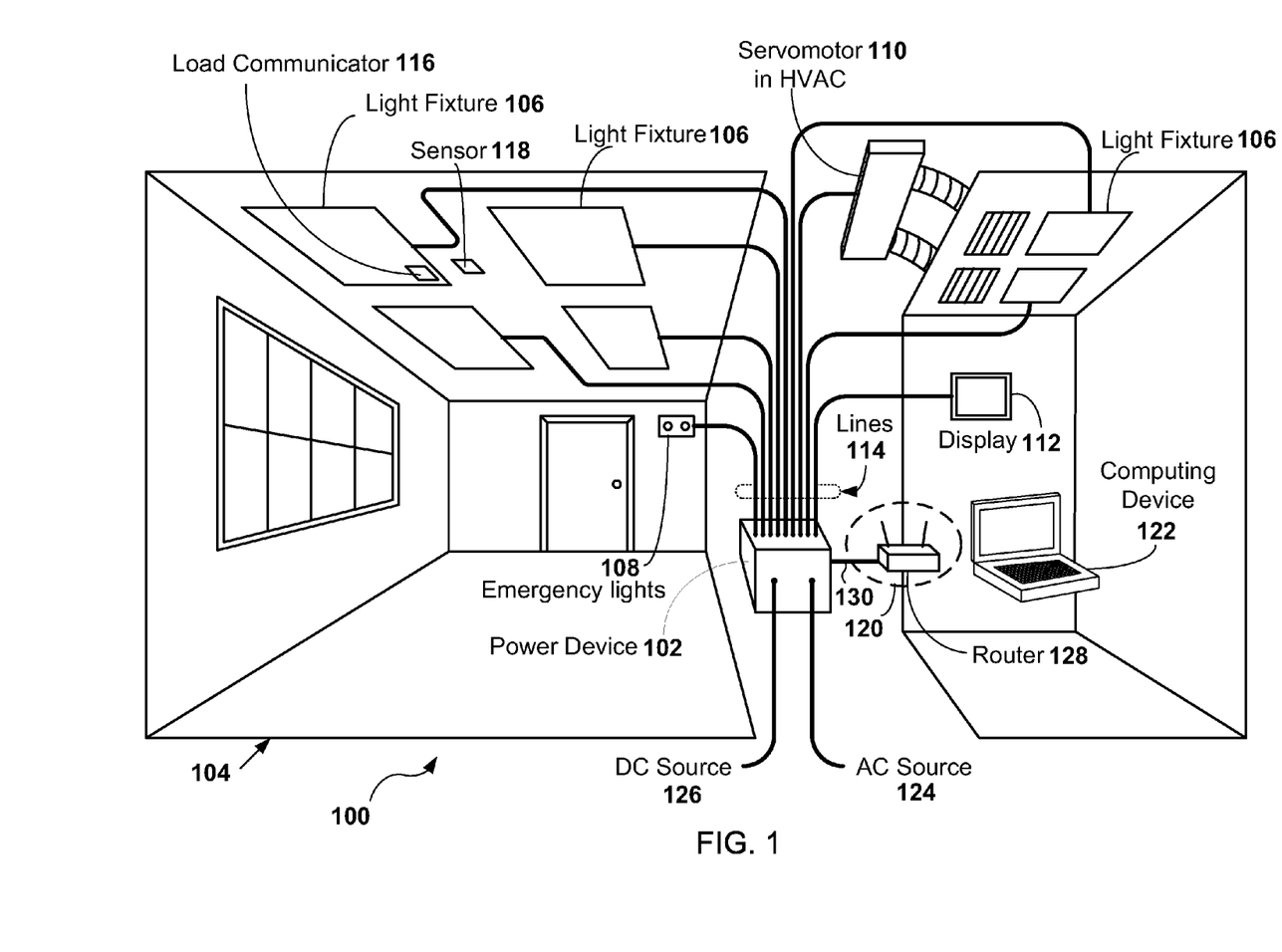
FIG. 1 illustrates an example of a system that uses the power device to intelligently power the load devices in a building.

FIG. 1 illustrates an example of a system 100 that uses the power device 102 to intelligently power the load devices in a building 104. Examples of the load devices illustrated in FIG. 1 include light fixtures 106, emergency lights 108, a servomotor 110 in an HVAC (Heating, Ventilating, and Air Conditioning) system, and a touchscreen display 112. The load devices may include more, fewer, or different devices. The load devices 106, 108, 110, and 112, may be installed throughout the building 104. The load devices may be affixed to the building 104, such as on a surface of the building 104, in a structure of the building 104, or any other suitable location in the building 104. For example, the load devices may be affixed to, or affixed in, a ceiling, a wall, a floor, a conduit, a closet or any other building location. Alternatively or in addition, the load devices may be installed outside of the building 104 or be in the building, but not affixed. The power device 102 may be located in the building 104. Alternatively, the power device 102 may be located externally to the building 104, such as in a parking garage, outdoor closet, in street lights, or any other suitable location.

The system 100 may include the power device 102 and the load devices. The system 100 may include more, fewer, or different elements. For example, the system 100 may include the lines 114 that transport the power from the power device 102 to the load devices as well as transport the data communicated between the power device 102 and the load devices. Alternatively or in addition, the system 100 may include the load communicator 116 adjacent to one or more of the load devices. Alternatively or in addition, one or more of the load devices may include the load communicator 116 as illustrated in FIG. 1. The load communicators may be paired with each of the load devices. Alternatively or in addition, one load communicator 116 may communicate with the power device 102 on behalf of multiple load devices electrically coupled to the same line to which the load communicator 116 and the power device 102 are electrically coupled. In one example, the system 100 may include one or more sensors 118, such as a photosensor, a motion detector, a thermometer, a particulate sensor, a radioactivity sensor, or any other type of device that measures a physical quantity and converts the quantity into an electromagnetic signal. For example, the sensors 118 may measure the quantity of $O_2$, $CO_2$, CO, VOC (volatile organic compound), humidity, evaporated LPG (liquefied petroleum gas), NG (natural gas), radon or mold in air; measure the quantity of LPG, NG, or other fuel in a tank; and measure sound waves with a microphone and/or ultrasonic transducer. The sensor 118 may be in communication with the load communicator 116, the power device 102, the load device 202, or any combination thereof. In one embodiment, the system 100 may include a data network 120, a computing device 122, or both.

The power device 102 may be any device or combination of devices that both powers with a DC power signal and communicates with one or more load devices, where the DC power signal and the communication are propagated over a shared conductor or conductors in the lines 114. In alternative embodiments, the power device 102 may include circuitry to provide power to the load devices in a housing that is separate from a housing that includes circuitry that communicates with the load devices. The power device 102 may communicate with the load device by communicating with the load communicator 116, which is electrically coupled to the line, whether the load communicator 116 is included in the load device or is a device separate from the load device. The power device 102 may adjust the power in the DC power signal based on information received from the load communicator 116.

The power device 102 generates the DC power signal on the lines 114 to the load devices from power received from at least one power source, 124 and 126. The power device 102 may receive power from one or more AC sources 124, such as the power grid from a utility company, a gas-powered generator, a wind-powered generator, or any combination of AC sources 124. Alternatively or in addition, the power device 102 may receive power from one or more DC sources 126, such as a battery, a solar panel, or any other source of DC power.

The building 104 may be any human-made structure used or intended for supporting or sheltering any use or continuous occupancy. For example, the building 104 may be a residential home, a commercial structure, a mobile home, or any other structure that may provide shelter to humans, animals, or any other tangible items.

The light fixture 106 may be any electrical device or combination of devices that creates artificial light from electricity. The light fixture 106 may distribute, filter or transform the light from one or more lamps included or installed in the light fixture 106. Alternatively or in addition, the light fixture 106 may include one or more lamps and/or ballasts. The lamps may include an incandescent bulb, a LED (Light-emitting Diode) light, a fluorescent light, a CFL (compact fluorescent lamp), a CCFL (Compact Fluorescent Lamp), or any other device now known or later discovered that generates artificial light. Examples of the light fixture 106 include a task/wall bracket fixture, a linear fluorescent high-bay, a spot light, a recessed louver light, a desk lamp, a commercial troffer, or any other device that includes one or more lamps. The light fixture 106, or any other type of load device, may include or be electrically coupled to an inverter that converts the DC power signal to AC if the light fixture 106 consumes AC.

The emergency lights 108 may be any device or combination of devices to provide lighting in the event of an emergency. For example, the emergency lights 108 may include a battery from which lamps in the emergency lights 108 may be powered. In the event of a loss of power from the AC source 124, the lamps in the emergency lights 108 may be lit by the battery. The battery may be charged by the DC power signal received over the lines 114. The load communicator 116 in the emergency light 108 may test the battery and transmit the results of the test to the power device 102.

The power device 102 may power, and communicate with, any type of electric motor. For example, the power device 102 may power, and communicate with, a ceiling fan motor, an actuator, the servomotor 110 in the HVAC system to control the flow of air in a duct, an actuator that adjusts louvers in a window, or a blind, an actuator that adjusts a window shade or a shutter, or any other type of electric motor. Alternatively or in addition, the power device 102 may communicate with the load communicator 116 that adjusts the opacity of a window or other surface though which light may pass.

The power device 102 may power, and communicate with, any control device. For example the power device 102 may power, and communicate with, the touchscreen display 112, a key pad, or any other suitable input device or interactive device.

The load communicator 116 may be any circuit, device, or combination of devices that communicates with the power device 102 over any of the lines 114. The load communicator 116 may transmit data to the power device 102, receive data from the power device 102, or any combination thereof.

In one example, the power device 102 may communicate over the data network 120. The data network 120 may be a local area network (LAN), a wireless local area network (WLAN), a personal area network (PAN), a wide area network (WAN), the Internet, Broadband over Power Line (BPL), any other now known or later developed communications network, or any combination thereof. For example, the data network 120 may include a wireless router 128 that is in communication with the power device 102 over an Ethernet cable 130 or that is integrated within the power device 102 or an adjacent communication device. The data network 120 may include any number of devices, such as, network switches, network hubs, routers, Ethernet switches, or any other type of network device.

The power device may communicate with one or more computing devices 122 over the data network 120. The computing device 122 may be any device that includes a processor, such as a general processor, central processing unit, application specific integrated circuit (ASIC), digital signal processor, field programmable gate array (FPGA), digital circuit, analog circuit, or any combination thereof. Examples of the computing device 122 include a laptop computer, a desktop computer, a server, a cell phone, a PDA (Personal Digital Assistant), a tablet computer, a customized application device, such as an HVAC controller, home automation system, control panel, or any other type of device that may communicate with the power device 102.

During operation of the system 100, the power device 102 may determine the power level suitable for each one of the load devices. The suitable power level may be determined using any mechanism that is based on communication between the power device 102 and the load devices.

For example, the power device 102 may receive, over each of the lines 114, an indication of the type of load device that is electrically coupled to each of the lines 114. For example, the type of load device may be a LED fixture, a particular model and brand of the LED fixture, a fluorescent light, a dimmable fluorescent light, a light fixture having a particular wattage rating, a ceiling fan, a display device, an HVAC controller, a photosensor, a motion sensor, or any other category of device. The power device 102, or the computing device 122, may determine a target power level for each one of the load devices based on the type of load device. In one example, an incandescent light fixture may have a higher target power level than a LED light fixture. In a second example, the target power level may depend on the brand or model of the load devices. As another example, the load device may include identifying data such as a manufacturer, a part number, a serial number, or any other information that identifies the load device. The load communicator 116 and/or the load device may use the identifying data to look up the load device on the Internet, to lookup the load device in the power device 102, or to lookup up the load device in any other system over the data network 120. Alternatively or in addition, the power device 102 may lookup the load device with the identifying data received from the load communicator 116 and/or the load device. For example, the power device 102 may lookup the load device on the Internet, in a memory of the power device 102, or in any other system over the data network 120. Parameters of the load device, such as the target power level, may be associated with the identifying data and be returned as a result of the lookup.

Alternatively or in addition, the power device 102 may receive, over each of the lines 114, the target power level that the power device 102 is to generate in order to power the load device 202. For example, the touchscreen display 112 may request that the power device 102 generate a five Volt DC power signal on the line 114 so that the power device 102 may power the touchscreen 112.

Alternatively or in addition, the power device 102 may communicate with multiple load devices in order to determine the target power level of the load devices. In one example, the load devices may include the light fixtures 106 and the touchscreen display 112. The touchscreen display 112 may operate as a dimming switch that controls the amount of light generated by the light fixtures 106. The touchscreen display 112 may display a slider control that adjusts the target light level. The power device 102 may receive the target light level set by the slider control. The power device 102 may adjust the amount of power in the DC power signal sent to the light fixtures 106 to match the target light level. For example, the power device 102 may store a mapping between the target light levels and target power levels for a particular brand of LED fixture. The power device 102, having received an indication from the light fixtures 106 that the light fixtures 106 are the particular brand of LED fixture, looks up the target light level received from the touchscreen display 112 in the mapping. The power device 102 adjusts the amount of power in the DC power signal sent to the light fixtures 106 to match the target light level found in the mapping. Alternatively or in addition, the power device 102 may switch off or dim a subset of the light fixtures 116 so that the sensor 118 indicates to the power device 102 that the measured light level in a lighting area of the building 104 matches the target light level.

The system 100 may use any other mechanism for determining the target power level that is based on communication between the power device 102 and one or more of the load devices. If, for example, each one of the load devices electrically coupled to the lines 114 has a different target power level than the other load devices, then the power device 102 may generate the DC power signal on each one of the lines 114 to have a different power level than the DC power signals on the other lines 114.

In order to generate the DC power signals, the power device 102 may draw power from one or more of the power sources 124 and 126. The power device 102 may dynamically select one of the power sources 124 and 126 based on the amount of power requested by the load devices, the amount of power the power sources 124 and 126 provide, the time of day, or based on any other suitable condition (e.g., being connected to only one type of power source). For example, the power device 102 may draw power from a solar panel source during daylight hours and from the power grid during night hours. Alternatively or in addition, the power device 102 may draw power from the solar panel source if a measured outside light level is above a threshold level. Alternatively or in addition, the power device 102 may draw power from the DC source 126 if the power level from the AC source 124 drops below a particular threshold. For example, the power device 102 may switch to a backup battery as the DC source 126 if the power from the AC source 124 is interrupted. The AC source 124 may be interrupted if, for example, there is a power failure on the power grid, a circuit breaker trips, or any other event occurs that prevents the AC source 124 from delivering power to the power device 102.

Alternatively or in addition, the power device 102 may power a subset of the load devices with a first power source and power a second subset of the load devices with a second power source. For example, the power device 102 may power light fixtures 106 from the DC source 126, such as a solar panel, but power other devices, such as the touchscreen display 112, from the AC source 124. Alternatively, if the power source 124 or 126 may provide a limited amount of power, the power device 102 may selectively shut off and/or otherwise reduce power consumption the load devices in response to the limited amount of power being available from the power source 124 or 126. In one example, the power device 102 may unilaterally reduce the power transmitted to the load devices. For example, the power device 102 may dim lights. If the load device is a type of device that may not work properly if the power is reduced, such as a motor, the power device 102 may decide not reduce the power transmitted to the load device. When more power becomes available, the power device 102 may restore the original power levels to the load devices. In a second example, the power device 102 may transmit a request to the load devices to reduce power consumption in view of the limited amount of power available. If any one of the load devices is capable of reducing power consumption, the load device may transmit a reduced target power level to the power device 102 or otherwise indicate that the load device may operate at a reduced power. For example, if the load device is an appliance that may run at any arbitrary time of the day, the load device may transmit the reduced target power level to the power device 102 in response to the request to reduce power consumption. Later, the load device may transmit a request for the original target power level to the power device 102. Alternatively or in addition, the power device 102 may transmit an indication to the load devices that more power is available from the power source 124 or 126.

2. Power and Communication over Same Conductor.

Figure 2:
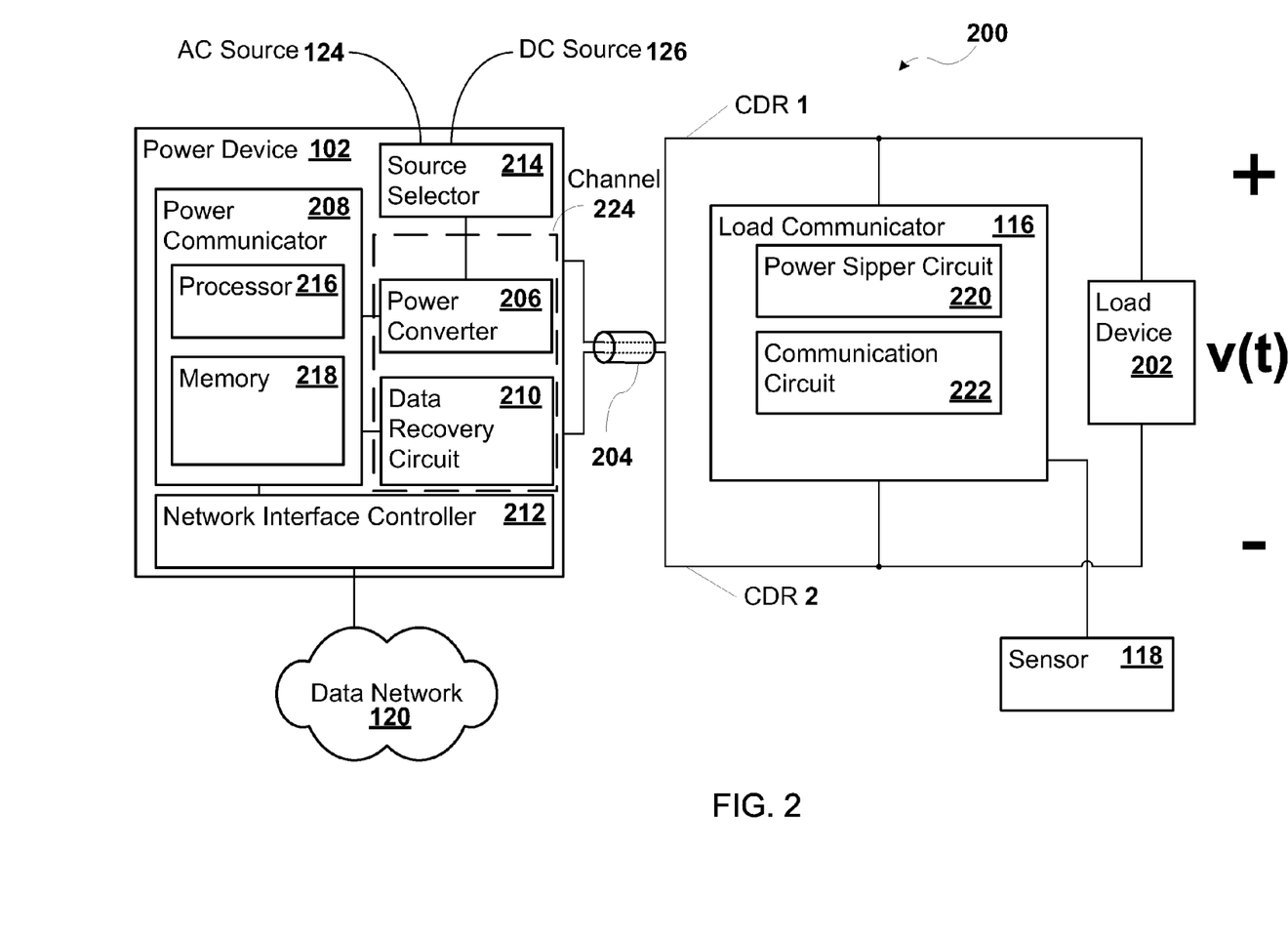
FIG. 2 illustrates a hardware diagram of an example system that uses the power device to intelligently power at least one load device.

FIG. 2 illustrates a hardware diagram of an example system 200 that uses the power device 102 to intelligently power at least one load device 202. The power device 102 may both power the load device 202 and communicate with the load communicator 116 over a single line 204, such as one of the lines 114 illustrated in FIG. 1. The power device 102 may also power the load communicator 116 over the single line 204. The single line 204 illustrated in FIG. 2 includes two conductors, CDR 1 and CDR 2. The line 204 may be any suitable tangible medium that can propagate an electromagnetic signal. For example, the line 204 may be twisted pair wiring, Ethernet wiring, 10 AWG (American wire gauge) building wiring, or any other type of wiring comprising at least two conductors, or a loop. The length of the line 204 may be any suitable length.

The system 200 may include the load device 202, the load communicator 116, the sensor 118, and the power device 102. The system 200 may include additional, fewer, or different components. In one example, the system 200 may include the computing device 122. In a second example, the system 200 may include only the load device 202, where the load device 202 includes the load communicator 116.

In the example illustrated in FIG. 2, the load device 202 is considered a load device because the load device 202 draws power from the power device 102. Consequently, the load device 202 may be a first load device and the load communicator 116 may be a second load device, as is illustrated in FIG. 2. The load communicator 116 is considered a load communicator because the load communicator 116 communicates with the power device 102 from the load device 202 or from nearby the load device 202. The communication between the power device 102 and the load communicator 116 may be unidirectional or bi-directional.

The power device 102 may be any device or combination of devices that provides power over one or two conductors, CDR 1 and CDR 2, and that communicates over the same conductors. The power device 102 may provide the power to the load device over the conductors, CDR 1 and CDR 2, as a DC (direct current) signal. In addition, the power device 102 may provide power and communicate over additional conductors included in the other lines 114, such as is illustrated in FIG. 1.

The power device 102 may control the amount of power delivered by the DC power signal through pulse-width modulation (PWM) of the signal, through amplitude modulation of the signal, or a combination thereof. PWM of the signal may include varying the duty cycle of the signal in order to vary the amount of power delivered. The duty cycle is the fraction of time that the signal is in an "active" state, which, for a periodic function, may be represented as:

$$\text{duty cycle } D = \tau/T$$

where $\tau$ is the duration that the function is in an active state and T is the period of the function. Alternatively or additionally, the power device 102 may vary the amplitude of the pulse-width modulated signal in order to change the average amount of power delivered to the load device while maintaining a constant duty cycle.

The power device 102 may generate any type of pulse-width modulated signal, such as a pulse wave, a square wave, or a rectangular wave. The signal may be considered in an active state when the voltage or the current of the signal exceeds a determined threshold. In one example, such as a rectangular wave, pulse-width modulation may be provided where the duty cycle is different than ½ or 0.5.

The power device 102 may transmit data to the load device 202 using frequency modulation of the pulse-width modulated signal while maintaining a constant duty cycle. By maintaining the constant duty cycle, the power device 102 may continue to deliver a constant average amount of power to the load device 202. For example, the power device 102 may generate n alternate waveforms, where each one of the wave forms has the same duty cycle, but each one of the waveforms has different frequencies. Each one of the alternate waveforms may represent one of n possible states to transmit over the line. Alternatively or in addition, different methods of transmitting data to the load communicator 116 may be used.

The power device 102 may include a power converter 206, a power communicator 208, a data recovery circuit 210, and a network interface controller 212. The power device 102 may include additional, fewer, or different components. In one example, the power device 102 may not include the network interface controller 212. In a second example, the power device 102 may include a source selector 214. In a third example, the power device 102 may include multiple power converters 206, one for each one of the lines 114.

The power converter 206 may include any circuit that generates the DC power signal over the conductors, CDR 1 and CDR 2, in order to power the load device 202. Examples of the power converter 206 include a switched-mode power supply, an AC to DC (Alternating Current to Direct Current) converter, a DC to DC (Direct Current to Direct Current) converter, a fixed-frequency PWM converter, a variable-frequency quasi-resonant ZCS/ZVS (zero-current switching/zero-voltage switching) converter, a voltage converter, a current converter, a hysteretic converter, a PWM buck converter, and any other suitable power source.

The power communicator 208 may be any circuit, device, or combination of devices that controls the DC power signal generated by the power converter 206 in order to transmit data over the line 204. Alternatively or in addition, the power communicator 208 may be any circuit, device, or combination of devices that receives data from the line 204. The power communicator 208 may receive the data from the line 204 through the data recovery circuit 210. The power communicator 208 may communicate over the data network 120 via the network interface controller 212. In one example, the power communicator 208 may additionally control the DC power signal generated by the power converter 206 in order to control the amount of power delivered to the load device 202.

The power communicator 208 may include a processor 216 and a memory 218. The processor 216 may be in communication with the memory 218. The processor 216 may be in communication with other components, such as the power converter 206, the data recovery circuit 210, and the network interface controller 212.

The memory 218 may be any now known, or later discovered, data storage device, component or combination thereof. The memory 218 may include non-volatile and/or volatile memory, such as a random access memory (RAM), a read-only memory (ROM), an erasable programmable read-only memory (EPROM), flash memory, or any other type of electronic storage component. Alternatively or in addition, the memory 218 may include an optical, magnetic (hard-drive) or any other form of data storage device.

The processor 216 may be a general processor, central processing unit, server, application specific integrated circuit (ASIC), digital signal processor, field programmable gate array (FPGA), digital circuit, analog circuit, or any combinations thereof. The processor 216 may be operable to execute computer executable instructions or computer code embodied in the memory 218 or in other memory to implement the functionality of the power communicator 208. The computer code may include instructions executable with the processor 216. The computer code may be written in any computer language now known or later discovered, such as C++, C#, Java, Pascal, Visual Basic, Perl, HyperText Markup Language (HTML), JavaScript, assembly language, and any combination thereof. In one example, the memory 218 may include an operating system, such as LINUX®, a registered trademark of individual, William Croce of Boston, Mass.

The network interface controller (NIC) 212 may include hardware or a combination of hardware and software that enables communication over the data network 120. The NIC 212 may provide physical access to the data network 120 and provide a low-level addressing system through use of Media Access Control (MAC) addresses. The NIC 212 may include a network card that is installed inside a computer or other device. Alternatively, the NIC 212 may include an embedded component as part of a circuit board, a computer mother board, a router, an expansion card, a printer interface, a USB (universal serial bus) device, or as part of any other hardware.

The source selector 214 may be any circuit that may selectively distribute power from two or more power sources, such as the AC source 124 and the DC source 126, to one or more power converters 206. The source selector 214 may include, for example, a relay, a power transistor, a TRIAC (triode for alternating current), and/or a SCR (silicon-controlled rectifier) for selectively distributing the power from two or more power sources 124 and 126.

The data recovery circuit 210 may be any circuit that facilitates extracting data received from the line 204. The data recovery circuit 210 may recover all or a portion of a data signal transmitted from the load communicator 116 over the line 204.

The load communicator 116 may be any circuit, device, or combination of devices that transmits and receives data over the line 204. For example, the load communicator 116 may be a light adapter that receives a light level signal from the sensor 118, where the light level signal indicates the light level measured by the sensor 118. The load communicator 116 may transmit data, such as the measured light level, to the power device 102. As another example, the load communicator 116 may be a motor adapter that receives a position signal from an optical or resistive sensor, where the position signal indicates the position of the shaft of the motor. Alternatively or in addition, the load communicator 116 may receive a rotational speed of a motor shaft, a position of a solenoid, or any other data measured from a physical characteristic. The load communicator 116 may include a power sipper circuit 220 and a communication circuit 222. The load communicator 116 may include additional, fewer, or different components. For example, the load communicator 116 may not include the power sipper circuit 220.

The power sipper circuit 220 may be any circuit configured to store power received on the line 204 so as to generate a regulated DC power signal that powers the communication circuit 222, the sensor 118, any other suitable device, or any combination thereof. The power sipper circuit 220 may include, for example, a linear regulator or a switching regulator.

The communication circuit 222 may be any circuit that sends and receives information over the line 204. The communication circuit 222 may include a processor and a memory, such as the processor 216 and the memory 218 included in the power communicator 208, but where the processor executes computer instructions or computer code embodied in the memory to implement the functionality of the communication circuit 222.

During operation of the system 100 or 200, the communication circuit 222 may transmit data to the power device 102 using any number of possible communication techniques. In one example, the communication circuit 222 may alter the impedance between the two conductors, CDR 1 and CDR 2. To do so, the communication circuit 222 may connect or disconnect a component between the conductors, CDR 1 and CDR 2, thereby altering the impedance on line 204. The data recovery circuit 210 of the power device 102 may detect the altered impedance by detecting a change in an operating frequency of the power converter 206, if the power converter 206 includes a hysteretic controller. The operating frequency is the frequency of a signal internal to the power converter 206 that is filtered to produce the DC power signal on the line 204 when DC power signal is active. For example, the signal internal to the power converter 210 may be filtered with a filter comprising an inductor and a capacitor. The communication between the power device 102 and the communication circuit 222 may be the same as the communication between a control device and a communication circuit described in U.S. patent application Ser. No. 12/389,868, entitled "TRANSMISSION OF POWER AND DATA WITH FREQUENCY MODULATION," filed Feb. 20, 2009, the entire contents of which are hereby incorporated herein by reference. Thus, the communication circuit 222 may transmit data to the power device 102 by altering the impedance on the line 204.

In a second example, the communication circuit 222 may alter the resistance in the electrical path between the two conductors, CDR 1 and CDR 2, by connecting or disconnecting a component between the conductors. If the power converter 206 is a current source, altering the resistance results in a change in the voltage, v(t), on the line 204. The data recovery circuit 210 may detect changes in the voltage, v(t), on the line 204, by comparing the line voltage, v(t), to a reference voltage. If the voltage, v(t), on the line 204 is above the reference voltage, then the data recovery circuit 210 may determine that the communication circuit 222 in the load communicator 116 has increased the resistance on the line 204. The communication between the power device 102 and the load communicator 116 may be the same as the communication between a control system and a load communicator described in U.S. patent application Ser. No. 12/536,231, entitled "DIGITAL SWITCH COMMUNICATION," filed Aug. 5, 2009, the entire contents of which are hereby incorporated herein by reference. Thus, the communication circuit 222 may transmit data to the power device 102 by switching a resistive element in and out of the electrical path between the two conductors, CDR 1 and CDR 2.

In a third example, the communication circuit 222 may short the two conductors, CDR 1 and CDR 2, during a discharge cycle of the DC power signal on the line 204 if the load device 202 includes a LED or any other diode that has a diode forward voltage drop, $V_d$. Each period of the DC power signal may include a charge cycle and a discharge cycle. During the charge cycle, the power device 102 is active and charges the line 204. During the discharge cycle, the power device 102 is inactive, and does not charge or discharge the line. If the voltage, v(t), on the line 204 when the discharge cycle begins is greater than the total diode forward voltage drop, $V_d$, of the LED, then the voltage, v(t), on the line 204 almost immediately drops to $V_d$. During the rest of the discharge cycle, the voltage on the line 204 decreases at a rate determined by parasitic electrical losses in the power device 102, the line 204, the load communicator 116, and the load device 202. If the voltage on the line 204 when the discharge cycle begins is less than or equal to the total diode forward voltage drop, $V_d$, then the voltage on the line 204 may simply decrease at a rate determined by parasitic electrical losses during the discharge cycle. Consequently, the line 204 may not fully discharge before the next charge cycle begins. However, if the communication circuit 222 shorts the two conductors, CDR 1 and CDR 2, during the discharge cycle, then the voltage, v(t), on the line 204 may drop suddenly to zero. The data recovery circuit 210 in the power device 102 may compare the voltage, v(t), on the line 204 with a calibrated reference voltage at a particular point in time during the discharge cycle. If the voltage on the line 204 is below the calibrated reference voltage, then the data recovery circuit 210 may detect the communication circuit 222 shorting the line 204. Alternatively, if the voltage on the line 204 is above the calibrated reference voltage, then the data recovery circuit 210 may determine that the communication circuit 222 did not short the line 204. The communication between the power device 102 and the load communicator 116 may be the same as the communication between a power device and a load communicator described in U.S. patent application Ser. No. 12/465,800, entitled "DISCHARGE CYCLE COMMUNICATION," filed May 14, 2009, the entire contents of which are hereby incorporated herein by reference. Thus, the communication circuit 222 may transmit data to the power device 102 by shorting the two conductors, CDR 1 and CDR 2 during the discharge cycle if the load device 202 includes a LED or any other diode that has a diode forward voltage drop, $V_d$.

As discussed above, the communication circuit 222 may transmit data to the power device 102 using any number of possible communication techniques. As also discussed above, the power device 102 may transmit data to the communication circuit 222 using frequency modulation of the pulse-width modulated signal. In one example, the power device 102 and the communication circuit 222 may include a communication protocol module executable with a processor, such as the processor 216 in the power device 102. The communication protocol module may implement the logic of any communication protocol now known or later discovered. The communication protocol module may be layered above and transmit and receive data using any of the suitable techniques described above. Accordingly, software stored in the memory 218 of the power device 102 and in memory of the load communicator 116 may communicate with each other by invoking programmatic functions implemented in the communication protocol modules. Examples of the communication protocol include TCP/IP (transport control protocol/Internet Protocol), RS-232 (Recommended Standard 232), USB (Universal Serial Bus) or any other type of communication protocol.

In one example, the communication protocol may be a simple protocol that facilitates transmission and receipt of symbols. Each symbol may be represented by a fixed number of bits, such as 8 or 16 bits. An escape sequence may be a predefined sequence of symbols. In one embodiment, a notice of a hardware interrupt generated at the load communicator 116 may be communicated to the power device 102 by transmitting a particular escape sequence that corresponds to the hardware interrupt from the load communicator 116 to the power device 102. The power device 102 may detect the particular escape sequence in a stream of symbols received from the load communicator 116 and, accordingly, handle the interrupt. The power device 102 may, for example, transmit an acknowledgement escape sequence to the load communicator 116 to indicate that the interrupt is handled.

3. Sensors and Monitoring.

The load communicator 116, the load device 202, or any combination thereof may also communicate with additional devices. In one example, the load communicator 102 may communicate with one or more sensors 118. The sensors 118 may be electrically coupled to the load communicator 102. For example, if the load communicator 116 is electrically coupled to the light fixture 106, the load communicator 116 may also be electrically coupled to a photosensor, a motion detector, any other suitable sensor 118, or any combination thereof. The load communicator 116 may process sensor signals received from the sensors 118. In one example, the load communicator 116 may transmit data based on the sensor signals to the power device 102. In a second example, the load communicator 102 may communicate with the load device 202. For example, the load communicator 116, such as the light adapter, may include the sensors 118 and be wired to the light fixture 106. The light fixture 106 may include a circuit board on which LEDs are mounted. The circuit board may include a component that communicates with the load communicator 116 in order to identify the light fixture 106 to the load communicator 116.

The sensor 118, the load communicator 116, or both may facilitate monitoring of the load device 202 or a subsystem of the load device 202. As described above, the load device 202 may transmit identifying information to the load communicator 116. The load device 202 may also transmit operating parameters that characterize the operation of the load device 202 to the load communicator 116. If the load device 202 is operating outside of the operating parameters, then the load communicator 116 may notify the power device 102. Alternatively or in addition, the load communicator 116 may relay the operating parameters to the power device 102 regardless of the values of the operating parameters.

For example, the load communicator 116 may be wired to, or be included in, the emergency lights 108. The load communicator 116 may monitor the health of the battery in the emergency lights 108. The load communicator 116 may receive a measure of the voltage of a battery from a voltmeter in the emergency lights 108. The load communicator 116 may notify the power device 102 if the voltage of the battery drops below a threshold voltage. Alternatively or in addition, the load communicator 116 may transmit the voltage of the battery to the power device 102 regardless of whether the voltage is below the threshold voltage. Alternatively or in addition, the power device 102 may charge the battery in the emergency lights 108 with the DC power signal that powers the emergency lights 108. Thus, the system 100 and 200 may constantly monitor the battery health and report end-of-life or near end-of-life conditions.

The batteries in the emergency lights 108 do not need to be manually checked. In addition, each of the emergency lights 108 do not need to convert AC to DC in order to charge the batteries.

The central control of the power generated by power device 102 in combination with the communication between the power device 102 and the load devices 202, facilitates processing emergency events. For example, the power device 102 may flash or blink the emergency lights 108, the light fixtures 106 used under normal conditions, or both depending on the emergency. The power device 102 may sequentially switch on and off the emergency lights 108, the light fixtures 106 used under normal conductions, or both, in order to direct occupants of the building 104 in a particular direction. For example, the light fixture 106 furthest from an exit may be switched on and off first, the next nearest light fixture 106 may be switched on and off next, and so on, moving progressively closer to the exit. The power device 102 may then repeat the process, started with the light fixture 106 furthest form the exit.

In one example, the emergency may be detected by one or more of the sensors 118 powered by the power device 102. In a second example, a different detection system may notify the power device 102 of the emergency.

4. Control of Power.

Each one of the lines 114 may be coupled to a respective channel 224 in the power device 102. A channel 224 of the power device 102 provides the DC power signal and the communication for one of the lines 114. The channel 224 may include the power converter 206 and any other circuit used to provide the DC power signal and to communicate over the line 204. The maximum power level per channel 224 may be 20 Watts or any other suitable power level. The power device 102 may generate a first maximum power level per channel 224 for a first set of channels and a second maximum power level per channel 224 for a second set of channels. Alternatively or in addition, the power device 102 may include a modular chassis that receives output channel cards. Each one of the channel cards may include at least a portion of the channel 224, such as the power converter 206 or switches for connecting the appropriate power converter 206. One example channel card may include multiple channels. Each one of the output channel cards may provide a different maximum power level per channel 224 than the other output channel cards. Alternatively or in addition, the load device 202, the load communicator 116, or both, may be electrically coupled to multiple lines 114 so as to be powered by a combination of the DC power signals received on the multiple lines. The load device 202 may be electrically coupled to multiple lines 114 by coupling the lines 114 together near the load communicator 116, the load device 202, the power device, or any combination thereof. The load communicator 116 may negotiate with the power device 102 in order to determine which one of the multiple lines 114 over which to perform subsequent communications between the load communicator 116 and the power device 102. In one example, all of the output channel cards may use a common communication mechanism. Alternatively, a first output channel card may use a different communication mechanism than a second output channel card. Therefore, different types of output channel cards may be inserted into the modular chassis in order for the power device 102 to provide a different maximum power levels to the load devices 202.

The power device 102 may be powered from the AC source 124, such as is received over standard building wiring. Alternatively or in addition, the power device 102 may be powered from the DC source 126, such as a battery or solar panel. Alternatively or in addition, the modular chassis of the power device 102 may receive inlet cards. The inlet cards may be designed to receive power from a particular type of power source. Therefore, the type of inlet card or cards that match a particular configuration may be selected and inserted into the modular chassis of the power device 102. A first example inlet card receives AC from a standard wall outlet. A second example inlet card receives power from the solar panel. A third example inlet card receives power from at least two sources 124 and 126. The third example inlet card may include the source selector 214. Alternatively or in addition, the source selector 214 may be electrically coupled to at least one of the inlet cards when the inlet card is inserted.

The source selector 214 may determine which of the multiple sources 124 and 126 is to power the power device 102. For example, the source selector 214 may select the power source 124 and 126 based on the time of day, the amount of power available from the power sources, the amount of power currently generated by the power device 102 on the lines 114, what type of load device is to receive the DC power signal, or based on any other criteria or combination thereof. Power selection policies may be stored in the memory 218 of the power device 102, in the computing device 122, or in any other memory or database. The power selection policies may be read by the source selector 214 in order to determine how the power source 124 and 126 is selected.

Alternatively or in addition, the source selector 214 may select one of the power sources 124 and 126 to power a first subset of the lines 114 and select a different one of the power sources 124 and 126 to power a second subset of the lines 114.

The power device 102 may control the DC power signals to increase the load factor of the power device 102. The load factor of a device is the average power consumed by the device divided by the peak power consumed by the device, the average being over a period of time. The peak may be a theoretical maximum, rather than a measured maximum. Each one of the channels of the power device 102 draws current. The power device 102 may generate a PWM DC power signal over the line 204 based on the current drawn by the channel 224. The power device 102 may increase the load factor of the power device 102 by interleaving the PWM DC power signals over the lines 114. Because the power device 102 may control a large number of devices over a large number of lines 114, the power device 102 may significantly increase the load factor by interleaving the PWM DC power signals. For example, the power device 102 may power 10, 50, 100, or any other suitable number of load devices 202 over as many lines 114.

Alternatively or in addition, the computing device 122 may be in communication with two or more power devices 102. The computing device 122 may communicate with each one of the power devices 102 over the data network 120 so that the PWM DC power signals generated by both of the power devices 102 may be interleaved. For example, the duty cycle of n/2 PWM DC power signals generated by one power device may be 1/n and the duty cycle of n/2 PWM DC power signals generated by another power device 102 may also be 1/n. If the n PWM DC power signals have the same period, T, then each one of the PWM DC power signals may be a different factor of T/n out of phase with a selected one of the PWM DC power signals, so that none of the n signals is in phase with the other signals. The n PWM DC power signals may be a subset of the DC power signals generated by the power devices 102. Alternatively or in addition, the power devices 102 may communicate with each other over the data network 120 directly—without involvement of the computing device 122—in order to interleave the PWM DC power signals.

The system 100 or 200 may monitor power levels or other power parameters, such as a power factor, in order to improve overall efficiency and detect potential problem areas. The power factor of a load is the real power flowing to the load divided by the apparent power flowing to the load. The power factor is a dimensionless number between 0 and 1. Real power is the capacity of the device for performing work in a particular time. Apparent power is the product of the current and voltage of the load. Due to energy stored in the load and returned to the source, or due to a non-linear load that distorts the wave shape of the current drawn from the source or alters the phase between the voltage and current waveforms, the apparent power will be greater than the real power. The power factor, voltage, current, volt-amperes, power level, such as power in watts, or any other suitable power-related parameter may be measured at various points in the system 100 or 200. For example, the power factor may be measured for each of the load devices 202.

For example, the power device 102 may measure the parameter or parameters at the input of the power device 102, which draws power from the input source 124 and 126. The power device 102 may measure the parameter or parameters at the outputs of the power device 102, where the DC power signal leaves the power device 102. Alternatively or in addition, the load communicator 116 may measure the parameter or parameters at the load device 202. The load device 202, the load communicator 116, or any combination thereof may determine from the measurements made at the load device 202 losses in the line 204. Alternatively or in addition, the measurements may be used together to determine whether the load device 202 is properly connected. For example, if the power drop from the power device 102 to the load device 220 exceeds a threshold value, then the power device 102 and/or the load communicator 116 may indicate that the load device 202 is improperly connected. For example, a LED on the power device 102, the load communicator 116, or both, may illuminate to indicate the improper connection. In another example, the computing device 112 may display an indication to a user of the computing device 112 that the load device 202 is improperly connected. The user may then check the connection of the load device 202. Alternatively or in addition, the efficiency at any stage in the system 100 or 200 may be reported to the user. The measurements may be made in real-time. Therefore, the power device 102 may determine whether a change in the power level any one of the outputs of the load device 220 results in a change in the efficiency of the power conversion in the load device 220. In general, if the output voltage is lowered, the efficiency of the system 100 or 200 may decrease provided that the input voltage remains relatively constant. Therefore, if the voltage of the input source 124 and 126 is fixed, the efficiency of the power conversion in the load device 220 may depend on the average output voltage measured on the lines 114.

5. Integration.

The systems 100 and 200 may be integrated with other systems. For example, the systems 100 and 200 may be integrated with an RFID (Radio Frequency Identification) system. If a person, animal, or object identified with an RFID tag enters an area of the building 104, the power device 102 may cause lights in the light fixtures 106 in the area to flash, change colors, dim or brighten; cause speakers to play an alert sound in the area; or alter the power to or communicate with any other load devices 104 in the area to indicate that the RFID tag entered the area of the building 104. Alternatively or in addition, the sensor 118 may include an RFID reader. The load communicator 116 may transmit an identity detected by the RFID reader to the power device 102. The power device 102 may communicate with the RFID system to determine whether the identity is authorized to enter the area. The RFID system may include a database of RFID identifiers and associated user identifiers. The database may also include policies, which may indicate whether a user is authorized to enter a particular area and what action to take in response to detection of the user in the particular area. Thus, any of the systems 100 and 200 integrated with the RFID system may form a security system. If the identity detected by the RFID reader is not stored in the database of RFID identifiers, any of the systems may take suitable action, such as generating an alert indicating where the unknown identity was detected.

Alternatively or in addition, the power device 102 may alter the power to or communicate with one or more of the load devices 104 to match preferences of the identity detected by the RFID reader. For example, the power device 102 may alter the color or amount of light generated by the light fixtures 106 in the area to match the preferences of the identity. As another example, the power device 102 may change the position of motors or actuators in order to match the preferences of the identity. For example, the power device 102 may alter a position of a window, a position of louvers in the window, a position of a door, or otherwise adjust any other load device in response to RFID identifier entering the area.

Alternatively or in addition, the systems 100 and 200 may be integrated with the HVAC system or some other building control system. The systems 100 and 200 may communicate with the building control system using a building control protocol. Examples of the building control protocol include BACnet, LONWORKS, or any other building control and automation protocol. BACnet is a communications protocol for building automation and control networks. It is an ASHRAE, ANSI, and ISO standard protocol. BACnet was designed to facilitate communication of building automation and control systems for applications such as heating, ventilating, and air-conditioning control, lighting control, access control, and fire detection systems and their associated equipment. The BACnet protocol provides mechanisms for computerized building automation devices to exchange information, regardless of the particular building service the devices perform. LONWORKS is a registered trademark of Echelon Corporation, San Jose, Calif. Alternatively, all or a portion of the electrical devices in the HVAC system may be powered by the power device 102 via the lines 114.

Alternatively or in addition, the systems 100 and 200 may be integrated with systems that include motors, sensors or both. The motors, sensors, or both may be load devices 202. The power device 102 may cause the motors, the sensors, or both to change position.

The load communicator 116, the power communicator 208 or both, may be reprogrammed based on the identity of the load devices 202. For example, the power device 102 may receive data that identifies the load devices 202 from the load devices 202. For example, the power device 102 may receive a part number from the load communicator 116 that identifies the load device 202. The power device 102 may search the Internet, send a request to a web service, or otherwise search any system via the data network 120 for the latest drivers of the identified load devices 202. The power device 102 may transmit the latest driver to the load communicator 116. The load communicator 116 may store computer instructions included in the latest driver in the memory of the load communicator 116. Alternatively or in addition, the power device 208 may update computer instructions in the memory 218 of the power device 208 with the latest driver or drivers for the power communicator 208.

Given the flexibility of the power device 102, the system 100 or 200 may not be integrated with any other system and yet still provide the functionality described above. For example, the system 100 or 200 alone, without being integrated with any other system, may operate as a security system. For example, the power device 102 may include the database of RFID identifiers, and at least one RFID reader may be included in the load device 202.

Figure 3:
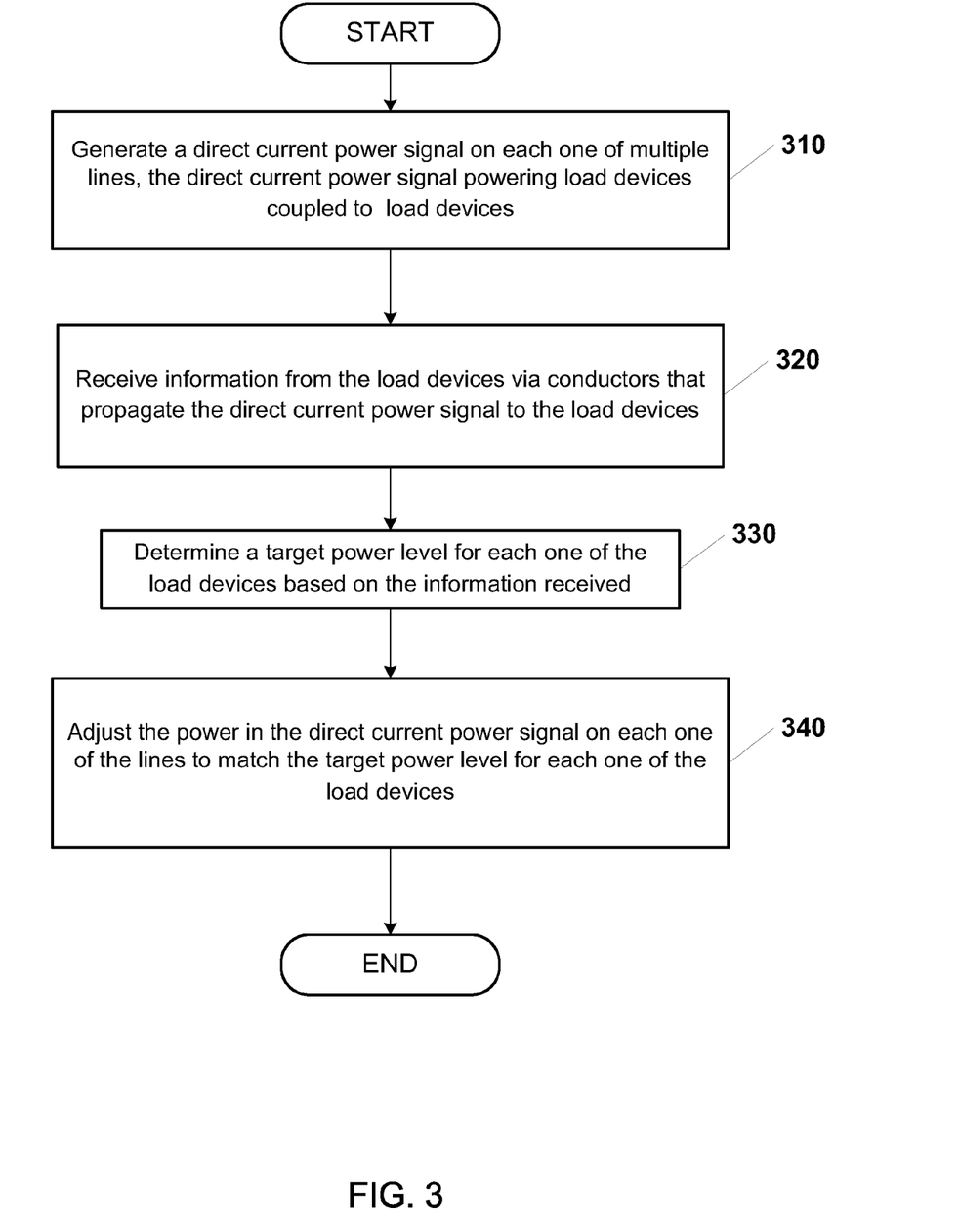
FIG. 3 illustrates an example flow diagram of the logic of the system to power load devices.

FIG. 3 illustrates an example flow diagram of the logic of the systems 100 and 200 to power load devices 202. The logic may include additional, different, or fewer operations. The operations may be executed in a different order than illustrated in FIG. 3.

The operation may begin by the direct current power signal being generated on each one the lines 114 by the power device 102, where the direct current power signal powers the load devices 202 electrically coupled to the lines (310). The current in the DC power signal may be at a minimum current level for initial communications so as to avoid damaging the load devices 202 through excess current. Different loads may be connected to different lines. For example, each one of the load devices 202 may be coupled to a different one of the lines 114 than the other load devices 202. As another example, two or more load devices 202 may be connected to a same line 204, but different lines 114 connect to different loads. In yet another example, more than two lines 114 may connect with a same load device 202, but different groups of lines 114 connected to different load devices 202. Combinations of these examples may be provided.

The operation may continue by information being received at the power device 102 from the load devices 202 via conductors, CDR 1 and CDR 2, that propagate the direct current power signal to the load devices (320). For example, the load communicators 116 in the load devices 202 may alter the impedances on the lines 114 and the power device 102 may receive the information by detecting the altered impedance. Alternatively, the power device 102 initiates communication.

The operation may continue by the power device 102 determining a target power level for each one of the load devices based on the information received (330). For example the power device 102 may receive the target power level from the load devices.

The operation may continue by the power device 102 adjusting an amount of power in the direct current power signal on each one of the lines 114 to match the target power level for each one of the load devices 202 (340). For example, the power device 102 may change the duty cycle of the direct current power signal. Alternatively or in addition, the power device 102 may change the amplitude of the direct current power signal. The operation may end, for example, by determining whether a new target power level is received from the load devices yet.

The systems 100 and 200 may have many advantages. The overall architecture provides flexibility. For example, the power device 102 may communicate with whatever type of load device is attached to the power device 102. Because the power device 102 communicates with the load device 202, the power device 102 may extract information on what the load device 202 is to be provided in terms of voltage and current, for example. Thus, the power device 102 may identify and power motors, servomotors, general controllers, input devices, such as switches, LCD touchscreens, or any other type of device. The power device 102 may power many load devices 202. Furthermore, multiple power devices 102 may be combined to power even more load devices 202. Thus, the power device 102 may both power and communicate with a large number of load devices 202.

The systems 100 and 200 may be considered closed loop systems, where the loop is between the power device 102 and the load devices 202. The sensors 118 may draw very little power. The sensors 118 may be powered by a single unit, the power device 102.

Using the same conductors, CDR 1 and CDR 2, for both transmitting power and communication may avoid requiring an overlay network for communication. As a result, installation is simplified. Efficiencies are gained by each of the load devices 202 not having to convert AC to DC. The wiring, such as twisted-pair wiring, may be less expensive than building wiring because the number of load devices 202 powered over the line 204 may be limited. The load communicator 116 may be inexpensively constructed, for example, costing less than an Ethernet transceiver.

The communication environment of the systems 100 and 200 may be a relatively low-noise environment compared to AC power lines. Twisted-pair wiring may cancel out electromagnetic interference (EMI) from external sources. The limited number of load devices 202 on each one of the lines 114 may limit noise resulting from low power factor rated load devices 202.

The systems 100 and 200 may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The systems 100 and 200 may be implemented with additional, different, or fewer entities. As one example, the processor 216 may be implemented as a microprocessor, a microcontroller, a DSP, an application specific integrated circuit (ASIC), discrete logic, or a combination of other types of circuits or logic. As another example, the memory 218 may be a non-volatile and/or volatile memory, such as a random access memory (RAM), a read-only memory (ROM), an erasable programmable read-only memory (EPROM), flash memory, any other type of memory now known or later discovered, or any combination thereof. The memory 218 may include an optical, magnetic (hard-drive) or any other form of data storage device.

The processing capability of the systems 100 and 200 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable media, for example, secondary storage devices such as hard disks, floppy disks, and CD-ROMs; a signal received from a network; or other forms of ROM or RAM either currently known or later developed. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system comprising:
a power converter configured to power a plurality of light fixtures with direct current power signals transmitted over wiring from the power converter to the light fixtures; and
a power communicator configured to communicate with a plurality of load communicators, one of the load communicators paired with one of the light fixtures, wherein
the power communicator is further configured to determine a target power level for the one of the light fixtures based on the communication with the one of the load communicators and to cause the power converter to power the one of the light fixtures at the target power level.

2. The system of claim 1 further comprising channels configured to couple the power converter to the wiring, wherein the wiring and the light fixtures are affixed to a building.

3. The system of claim 1, wherein the power communicator is further configured to identify a model of the one of the light fixtures based on the communication with the one of the load communicators.

4. The system of claim 1 further comprising a network interface controller, wherein the power communicator is further configured to transmit a request over a data network via the network interface controller, wherein the request is for a driver for the one of the light fixtures.

5. The system of claim 4, wherein the power communicator is further configured to receive the driver over the data network and transmit the driver over the wiring to the one of the load communicators corresponding to the one of the light fixtures, wherein the driver is executable with a processor in the one of the load communicators.

6. The system of claim 4, wherein the power communicator is further configured to receive the driver over the data network, and wherein the driver is executable with a processor of the power communicator.

7. The system of claim 1, wherein the power converter is configured to generate at least two of the direct current power signals out of phase with each other.

8. The system of claim 1 further comprising a first power device that comprises the power converter and the power communicator, wherein the first power device is configured to communicate with a second power device over a data network.

9. The system of claim 8, wherein the direct current power signals generated by the first power device comprise a plurality of first direct current power signals, and wherein the first power device is configured to generate at least two of the first direct current power signals out of phase with a plurality of second direct current power signals generated by the second power device based on communication between the first power device and the second power device over the data network.

10. The system of claim 1, wherein the power communicator is further configured to receive a power level reading from the one of the load communicators, determine, from the power level reading, a power drop from the power converter to the one of the light fixtures that is paired with the one of the load communicators, and determine whether the one of the light fixtures is properly connected based on the power drop.

11. The system of claim 1 further comprising a network interface controller, wherein the power communicator is further configured to receive the target power level for the one of the light fixtures over a data network via the network interface controller.

12. The system of claim 1, wherein the power communicator is further configured to receive the target power level for the one of the light fixtures from the one of the load communicators.

13. A system comprising:
a power device comprising a power converter and a power communicator,
the power converter configured to power a plurality of load devices with direct current power signals transmitted over wiring from the power converter to the load devices, and
the power communicator configured to communicate with a plurality of load communicators, one of the load communicators paired with one of the load devices; and
a computing device configured to communicate with the power device over a data network, the computing device further configured to determine a target power level for the one of the light fixtures based on the communication between the power device and the one of the load communicators and to cause the power converter to power the one of the load devices at the target power level.

14. The system of claim 13, wherein the power communicator is further configured to receive a power level measurement over the wiring from the one of the load communicators, the power level measurement indicative of power at the load device that is paired with the one of the load communicators.

15. The system of claim 14, wherein the power communicator is further configured to determine, based on the power level measurement, a power drop from the power converter to the one of the load devices.

16. The system of claim 15, wherein the power communicator is further configured to determine whether the one of the load devices is properly connected to the power device based on the power drop.

17. The system of claim 14, wherein the power communicator is further configured to determine whether a change in the power level measurement results in a change in efficiency of power conversion in the one of the load devices.

18. The system of claim 13, wherein the power device is further configured to power the one of the load devices with one of the direct current power signals transmitted by the power device over a plurality of lines to the one of the load devices, wherein the plurality of lines are included in the wiring.

19. The system of claim 18, wherein the power device is configured to determine which of the plurality of the lines over which to communicate with the one of the load communicators paired with the one of the load devices and to communicate with the one of the load communicators over the determined one of the lines.

20. A method comprising:
powering a light fixture by transmitting direct current power signals from a power device over wiring to the light fixture;
communicating between the power device and a load communicator that is paired with the light fixture; and
determining a target power level for the light fixture with the power device based on data communicated between the power device and the load communicator; and
adjusting the power of the direct current power signal with the power device based on the target power level determined for the light fixture.

* * * * *